United States Patent
Shibata et al.

(10) Patent No.: US 8,234,916 B2
(45) Date of Patent: Aug. 7, 2012

(54) ABNORMALITY DIAGNOSIS DEVICE FOR AIR-FUEL RATIO SENSOR

(75) Inventors: Daisuke Shibata, Numazu (JP); Hiroshi Sawada, Gotenba (JP); Yasuyuki Yokokawa, Yoshikawa (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 406 days.

(21) Appl. No.: 12/666,238

(22) PCT Filed: Jun. 19, 2008

(86) PCT No.: PCT/JP2008/061594
§ 371 (c)(1),
(2), (4) Date: Dec. 22, 2009

(87) PCT Pub. No.: WO2009/001878
PCT Pub. Date: Dec. 31, 2008

(65) Prior Publication Data
US 2010/0186491 A1  Jul. 29, 2010

(30) Foreign Application Priority Data
Jun. 22, 2007 (JP) ................. 2007-165403

(51) Int. Cl.
*G01M 15/04* (2006.01)

(52) U.S. Cl. .................................. 73/114.77

(58) Field of Classification Search ............. 73/114.38, 73/114.42, 114.77, 114.48
See application file for complete search history.

(56) References Cited

U.S. PATENT DOCUMENTS

| 5,329,914 | A | 7/1994 | Togai et al. |
| 5,845,489 | A | 12/1998 | Dohta et al. |
| 7,040,307 | B2 * | 5/2006 | Nagashima et al. ........... 123/688 |
| 7,285,204 | B2 * | 10/2007 | Iida et al. .................... 205/784.5 |
| 7,520,274 | B2 * | 4/2009 | Sawada et al. ................ 123/690 |
| 2008/0028829 | A1 * | 2/2008 | Sawada et al. ............... 73/23.32 |

FOREIGN PATENT DOCUMENTS

| JP | 62-218634 A | 9/1987 |
| JP | 9-166569 A | 6/1997 |
| JP | 10-196437 A | 7/1998 |
| JP | 2002-070612 A | 3/2002 |
| JP | 2002-276434 A | 9/2002 |
| JP | 2003-035183 A | 2/2003 |
| JP | 2003-172184 A | 6/2003 |
| JP | 2003-293844 A | 10/2003 |
| WO | 92/17696 A1 | 10/1992 |

OTHER PUBLICATIONS

Japanese Office Action for corresponding JP Patent Application No. 2007-165403 drafted Feb. 15, 2011.

* cited by examiner

*Primary Examiner* — Eric S McCall
(74) *Attorney, Agent, or Firm* — Sughrue Mion, PLLC (57) ABSTRACT

An abnormality diagnosis device according to the present invention can calculate a calculation air-fuel ratio A/Fk based upon a fuel injection quantity and an intake air quantity, and determine the abnormality of the air-fuel ratio sensor based upon the calculation air-fuel ratio and an actual air-fuel ratio detected by an air-fuel ratio sensor, when an operating condition in the internal combustion engine relatively rapidly changes according to an engine operating demand and thereby the calculation air-fuel ratio relatively rapidly changes. Since the air-fuel ratio is not forcibly changed and fluctuated, deterioration of the exhaust emission and the combustion state, and deterioration of the vibration and the noise at abnormality diagnosing can be certainly prevented.

5 Claims, 6 Drawing Sheets

ABNORMALITY DIAGNOSIS DEVICE FOR AIR-FUEL RATIO SENSOR

CROSS REFERENCE TO RELATED APPLICATION

This application is a National Stage of International Application No. PCT/JP2008/061594 filed Jun. 19, 2008, which claims priority from Japanese Patent Application No. 2007-165403, filed Jun. 22, 2007, the contents of all of which are incorporated herein by reference in their entirety.

TECHNICAL FIELD

The present invention relates to an abnormality diagnosis device for an air-fuel ratio sensor detecting an air-fuel ratio in exhaust gas for a compression ignition type internal combustion engine.

BACKGROUND ART

In general, in a compression ignition type internal combustion engine, that is, in a diesel engine, the combustion and the operation are usually carried out at an air-fuel ratio higher (leaner) than a theoretical air-fuel ratio. And, for restricting emissions of NOx caused by this, an NOx catalyst for reducing NOx in the exhaust gas is located in an exhaust system, or an exhaust gas recirculation (EGR) device for recirculating a part of the exhaust gas to an intake system is located. In recent years, for sufficiently effecting the NOx catalyst or the EGR device, an air-fuel ratio in the exhaust gas is detected even in the diesel engine and the detection value is used for exhaust gas control. Therefore, an example where an air-fuel ratio sensor is located in an exhaust system of the diesel engine is often provided. Since the air-fuel ratio sensor substantially serves to detect an oxygen concentration in the exhaust gas, it is also called an oxygen sensor or an oxygen concentration sensor.

Since the air-fuel ratio sensor is provided with a detection element exposed all the time to exhaust gas having a high temperature, the air-fuel ratio sensor is likely to be relatively easily degraded to become abnormal. When the air-fuel ratio sensor becomes abnormal, a desired exhaust gas control can not be performed, inevitably leading to deterioration in emissions. Therefore, it is conventionally performed to diagnose abnormality of the air-fuel ratio sensor. Particularly in a case of an engine mounted in an automobile, for beforehand preventing vehicle running in a state where emissions in the exhaust gas are deteriorated, it is also required from regulations in various countries or the like to diagnose abnormality of the air-fuel ratio sensor on board.

Conventionally the abnormality diagnosis of the air-fuel ratio sensor is applied mainly to a gasoline engine. This is because, since the gasoline engine is provided with a three-way catalyst and it is necessary to feedback-control an exhaust air-fuel ratio to a theoretical air-fuel ratio where this three-way catalyst shows high purification efficiency, the air-fuel ratio sensor is provided. In consequence, the number of an example of performing a diagnosis on abnormality of the air-fuel ratio sensor in the diesel engine is relatively small. When a diagnosis system disclosed in Japanese Patent Laid-Open No. 2003-293844 is taken as one example thereof, a reducing agent is supplied upstream of an oxygen concentration sensor at a steady operating condition of an engine and a degradation degree of the oxygen concentration sensor is diagnosed based upon responsiveness in output change of the oxygen concentration sensor at this supplying time.

There is generally carried out a method where in the abnormality diagnosis of the air-fuel ratio sensor in the gasoline engine, the exhaust air-fuel ratio is rather forcibly (actively) fluctuated in the vicinity of the theoretical air-fuel ratio to evaluate responsiveness or the like of the sensor at that time. In this case, the exhaust air-fuel ratio is out of the theoretical air-fuel ratio not a little and therefore, deterioration of the exhaust emissions is inevitable. However, as long as the exhaust air-fuel ratio is fluctuated in the vicinity of the theoretical air-fuel ratio, the deterioration of the exhaust gas emission can be restricted in some measure, since the purification performance of the three-way catalyst is usable.

However, in a case of the diesel engine, the engine operates usually in a region of an air-fuel ratio leaner than the theoretical air-fuel ratio and also in a wider region thereof (A/F=approximately 20 to 60). Therefore, if the air-fuel ratio is forcibly moved to the vicinity of the theoretical air-fuel ratio (A/F=about 14.6) or forcibly fluctuated, that adversely affects the combustion itself of the engine. In addition, not only the exhaust emission is remarkably deteriorated, but also even a desired engine output can not be obtained, and vibrations, noises and the like are also deteriorated. That is, the forcible change or fluctuation of the air-fuel ratio is not appropriate for the diesel engine, resulting in large deterioration in performance of the engine.

Therefore, the present invention is made in view of the foregoing problem, and an object of the present invention is to provide an abnormality diagnosis device for an air-fuel ratio sensor suitable for an air-fuel ratio sensor provided in a compression ignition type internal combustion engine.

DISCLOSURE OF THE INVENTION

According to a first aspect of the present invention, an abnormality diagnosis device for an air-fuel ratio sensor detecting an air-fuel ratio in exhaust gas in a compression ignition type internal combustion engine comprises:

calculation air-fuel ratio calculating means for calculating a calculation air-fuel ratio based upon at least a fuel injection quantity and an intake air quantity in the internal combustion engine; and abnormality determining means for determining abnormality of the air-fuel ratio sensor based upon the calculation air-fuel ratio and an actual air-fuel ratio detected by the air-fuel ratio sensor, when an operating condition in the internal combustion engine relatively rapidly changes according to an engine operating demand and thereby the calculation air-fuel ratio relatively rapidly changes.

According to the first aspect of the present invention, not in a case where the air-fuel ratio is actively changed, but when the operating condition in the internal combustion engine relatively rapidly changes according to the engine operating demand and thereby the calculation air-fuel ratio relatively rapidly changes, the abnormality of the air-fuel ratio sensor is determined based upon the calculation air-fuel ratio and the actual air-fuel ratio at this time. Therefore, since the air-fuel ratio is not forcibly changed or fluctuated, deterioration in the exhaust emission and the combustion state, and deterioration in the vibration and the noise at abnormality diagnosing can be certainly prevented. Thus the abnormality diagnosis device suitable for the air-fuel ratio sensor provided in the compression ignition type internal combustion engine can be provided.

According to a second aspect of the present invention, in the first aspect, the abnormality determining means calculates a responsiveness abnormality determining value based upon the calculation air-fuel ratio and compares the actual air-fuel ratio after a predetermined elapse time from a change start of the calculation air-fuel ratio with the responsiveness abnormality determining value to determine the abnormality of the air-fuel ratio sensor.

According to this, the responsiveness abnormality determining value as a criterion for determining the abnormality of the air-fuel ratio sensor, particularly the responsiveness abnormality of the air-fuel ratio sensor, is calculated based upon the calculation air-fuel ratio. Therefore, an appropriate responsiveness abnormality determining value in accordance with an actual changing state of the calculation air-fuel ratio can be obtained. Also, by comparing the actual air-fuel ratio after the predetermined elapse time from the change start of the calculation air-fuel ratio with the responsiveness abnormality determining value, the abnormality, in particular the responsiveness abnormality of the air-fuel ratio sensor is determined. In consequence, the responsiveness abnormality of the air-fuel ratio sensor can be certainly detected.

According to a third aspect of the present invention, in the first or second aspect, the abnormality determining means calculates a waste time from a difference between a change start time of the calculation air-fuel ratio and a change start time of the actual air-fuel ratio and compares the waste time with a predetermined waste time abnormality determining value to determine the abnormality of the air-fuel ratio sensor.

According to this, the abnormality of the air-fuel ratio sensor, particularly the abnormality of the waste time in the air-fuel ratio sensor can be certainly detected.

According to a fourth aspect of the present invention, in any of the first to third aspects, the abnormality determining means determines the abnormality of the air-fuel ratio sensor when an operating condition in the internal combustion engine relatively rapidly changes from a steady condition, and makes correction for making the calculation air-fuel ratio equal to the actual air-fuel ratio when the calculation air-fuel ratio and the actual air-fuel ratio are in a steady condition during the steady condition of the internal combustion engine.

According to this, since the abnormality of the air-fuel ratio sensor is determined when the operating condition in the internal combustion engine relatively rapidly changes from the steady condition, the abnormality diagnosis can be performed in a case of an internal combustion engine for an automobile for example, at a vehicle start time from an idling condition or at accelerating or decelerating from a constant speed running and many diagnosis opportunities can be secured. Further, when the calculation air-fuel ratio and the actual air-fuel ratio become in the steady condition, the correction for matching them is made. Therefore, the diagnosis can be performed after a difference therebetween is eliminated, thereby improving the diagnosis accuracy.

According to a fifth aspect of the present invention, in any of the first to fourth aspects, the abnormality determining means calculates a changing speed when the calculation air-fuel ratio changes by a predetermined value or more, and determines the abnormality of the air-fuel ratio sensor when the changing speed is a predetermined value or more.

According to this, when the changing speed of the calculation air-fuel ratio is the predetermined value or more, that is, only when the calculation air-fuel ratio changes sufficiently fast, the diagnosis is performed. Therefore, the responsiveness abnormality of the air-fuel ratio sensor can be accurately detected.

According to a sixth aspect of the present invention, in the third aspect, the abnormality determining means calculates an integral value of intake air quantity during the waste time, and calculates the waste time abnormality determining value based upon the integral value of the intake air quantity.

The waste time corresponding to a period from the change start time of the calculation air-fuel ratio to the change start time of the actual air-fuel ratio changes in response to a magnitude of the intake air quantity, that is, a magnitude of the exhaust gas flow rate. According to the sixth aspect, an appropriate waste time abnormality determining value can be calculated in consideration of the exhaust gas flow rate during the waste time to accurately detect the abnormality of the waste time.

The present invention achieves an excellent effect of being capable of providing an abnormality diagnosis device for an air-fuel ratio sensor suitable for an air-fuel ratio sensor provided in a compression ignition type internal combustion engine.

BEST MODE FOR CARRYING OUT THE INVENTION

Hereinafter, the best mode of carrying out the present invention will be explained with reference to the accompanying drawings.

Figure 1:
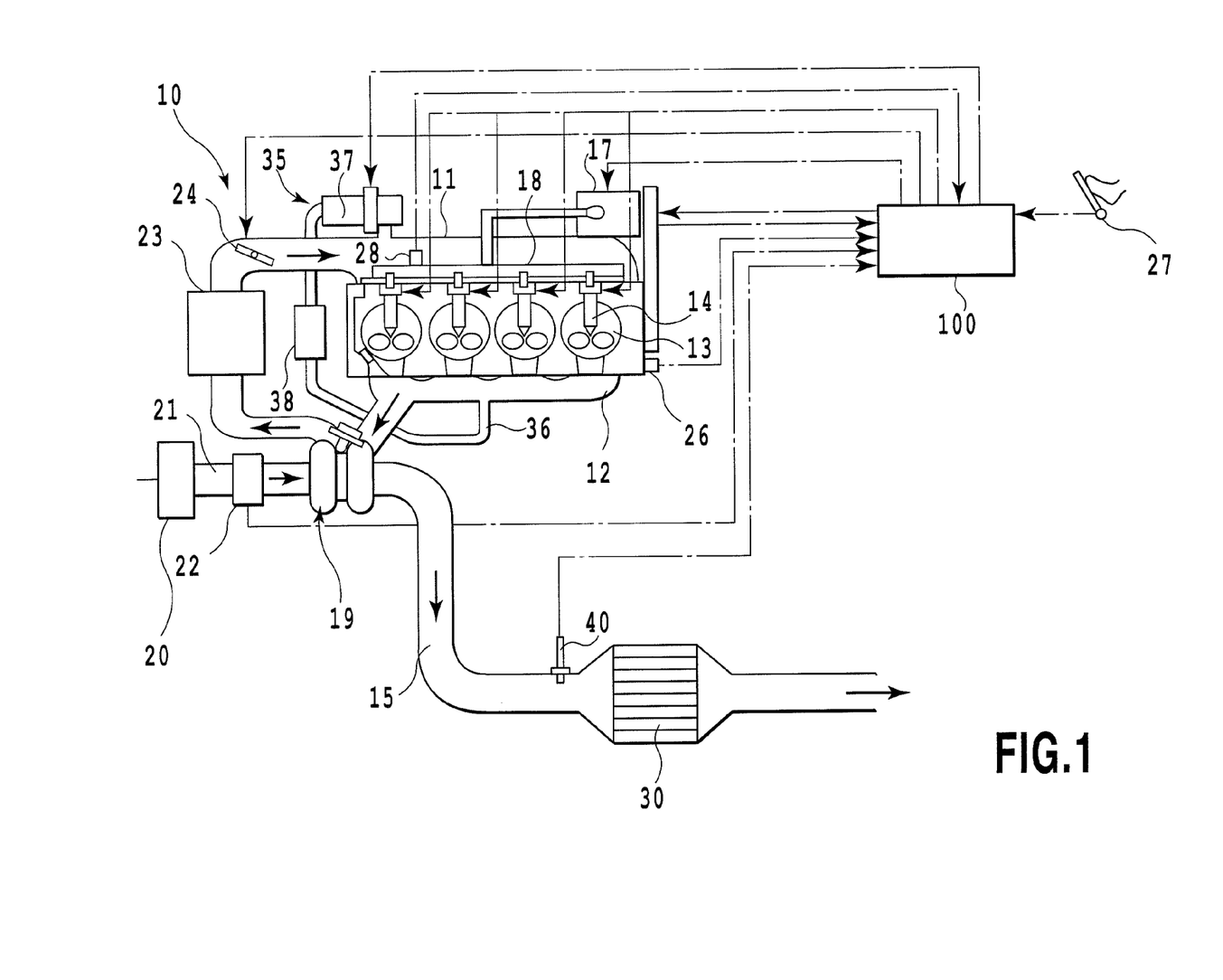
FIG. 1 is a schematic system diagram showing an internal combustion engine according to an embodiment of the present invention.

FIG. 1 is a schematic system diagram showing an internal combustion engine according to an embodiment of the present invention. Denoted at 10 is a compression ignition type internal combustion engine for an automobile, that is, a diesel engine, denoted at 11 is an intake manifold communicated with an intake port, denoted at 12 is an exhaust manifold communicated with an exhaust port and denoted at 13 is a combustion chamber. In the present embodiment, fuel supplied from a fuel tank (not shown) to a high-pressure pump 17 is supplied under pressure from the high-pressure pump 17 to a common rail 18 to be accumulated in a high-pressure state therein. The high-pressure fuel in the common rail 18 is directly injected from an injector (fuel injection valve) 14 into the combustion chamber 13. Exhaust gas from the engine 10 goes through from the exhaust manifold 12 to a turbocharger 19, then flows into an exhaust passage 15 downstream thereof, is purified as described later, and then is discharged into atmosphere. It should be noted that a type of the diesel engine is not limited to one equipped with a common rail type fuel injection device.

Intake air introduced from an air cleaner 20 into an intake passage 21 flows through an air flow meter 22, the turbocharger 19, an intercooler 23, and a throttle valve 24 in that order, and reaches to the intake manifold 11. The air flow meter 22 is a sensor for detecting an intake air quantity, and specially outputs a signal in accordance with flow rate of the intake air. An electrically controlled type is adopted as the throttle valve 24.

A catalyst 30 is located in the exhaust passage 15 downstream of the turbocharger 19. In a case of the present embodiment, the catalyst 30 comprises an NOx catalyst for reducing NOx in the exhaust gas for removal. The NOx catalyst comprises an adsorption reduction type NOx catalyst, and absorbs NOx in the exhaust gas when the usual exhaust air-fuel ratio is in a lean range. In addition, when rich spike is performed by post-injection or the like to make the exhaust air-fuel ratio temporarily rich, the absorbed NOx is released from the NOx catalyst and this released NOx reacts with HC in the exhaust gas as a reducing agent to be reduced and removed. It should be noted that it is preferable to provide a diesel particulate filter (DPF) or an oxidation catalyst as the other exhaust gas purifying device provided in the exhaust passage. The NOx catalyst may be a selective reduction type NOx catalyst.

In addition, the engine 10 is provided with an EGR device 35 for recirculating a part of the exhaust gas into the intake system. The EGR device 35 is provided with an EGR passage 36 communicating the exhaust passage 15 (exhaust manifold 12) with the intake passage 21 (intake manifold 11), an EGR valve 37 provided in the EGR passage 36, and an EGR cooler 38 provided upstream of the EGR valve 37 in the EGR passage 36. The EGR valve 37 adjusts a flow rate of the exhaust gas flowing in the EGR passage 36, that is, a flow rate of an EGR gas recirculated from the exhaust system to the intake system. The EGR cooler 38 cools the EGR gas for increasing a flow rate of the EGR gas retuned to the intake system.

An electronic control unit (hereinafter, referred to as ECU) 100 is provided as control means for managing control of the entire engine. ECU 100 includes a CPU, a ROM, a RAM, input/output ports, a memory device, and the like. ECU 100 controls the injector 14, the high-pressure pump 17, the throttle valve 24, the EGR valve 37 and the like in such a manner that a desired engine control is performed based upon detection values of various sensors or the like. Sensors connected to the ECU 100 include the aforementioned air flow meter 22, and besides, a crank angle sensor 26 for detecting a crank angle of the engine 10, an accelerator opening sensor 27 for detecting an accelerator opening, and a common rail pressure sensor 28 for detecting a fuel pressure (common rail pressure) in the common rail 18. ECU 100 calculates a rotation speed of the engine 10 based upon output of the crank angle sensor 26.

ECU 100 controls a fuel injection quantity injected from the injector 14 based upon an engine operating condition (mainly rotation speed and accelerator opening). In addition, ECU 100 controls the EGR valve 37 and the throttle valve 24 so that a ratio of EGR gas quantity to the entire intake air becomes a predetermined target EGR ratio. Further, ECU 100 controls the high-pressure pump 17 so that an actual common rail pressure detected by the common rail pressure sensor 28 becomes a predetermined target common rail pressure.

An air-fuel ratio sensor 40 is located upstream of the NOx catalyst 30 in the exhaust passage 15 for detecting an air-fuel ratio A/F of the exhaust gas flowing into the NOx catalyst 30, and this air-fuel ratio sensor 40 is also connected to ECU 100. The air-fuel ratio sensor 40 is used for estimating an NOx quantity absorbed into the NOx catalyst 30, for example, and further, is used for determining timing of rich spike for releasing the absorbed NOx from the NOx catalyst 30. It should be noted that it is possible to use the air-fuel ratio sensor 40 for the other various applications and objects.

The air-fuel ratio sensor 40 is also called as an oxygen sensor or an oxygen concentration sensor and outputs an electrical signal in accordance with an oxygen concentration of the exhaust gas. A value of this electrical signal is converted into an air-fuel ratio by ECU 100. The air-fuel ratio sensor 40 can continuously detect an air-fuel ratio over an air-fuel ratio region in a wide range corresponding to an air-fuel ratio region (for example, A/F=approximately 20 to 60) where an engine operates.

As the other sensors it is preferable to provide an exhaust gas temperature sensor for detecting an exhaust gas temperature, an NOx sensor for detecting NOx concentration in the exhaust gas or the like.

Next, an abnormality diagnosis for the air-fuel ratio sensor 40 will be explained.

In the abnormality diagnosis, first, ECU 100 calculates a value of a calculation air-fuel ratio based upon a fuel injection quantity Q and an intake air quantity Ga in the engine 10. That is, ECU 100 determines a fuel injection quantity Q as a fuel quantity to be injected the next time for each injection according to a predetermined map or the like based upon an engine rotation speed Ne detected based upon output of the crank angle sensor 26 and an accelerator opening Ac detected by the accelerator opening sensor 27. Further, ECU 100 calculates a calculation air-fuel ratio A/Fk=Ga/Q as a ratio of a fuel injection quantity Q as the internal value or the indication value and an intake air quantity Ga detected by the air flow meter 22 based upon these quantities Q and Ga. The calculation air-fuel ratio A/Fk serves as an input air-fuel ratio given to the air-fuel ratio sensor 40.

Next, when an operating condition in the engine 10 relatively rapidly changes according to an engine operating demand and thereby the calculation air-fuel ratio A/Fk relatively rapidly changes, ECU 100 determines abnormality of the air-fuel ratio sensor 40 based upon the calculation air-fuel ratio and an actual air-fuel ratio A/Fr detected by the air-fuel ratio sensor 40 at that time. That is, when the operating condition in the engine 10 relatively rapidly changes, the calculation air-fuel ratio A/Fk relatively rapidly changes substantially at the same time, and then the actual air-fuel ratio A/Fr changes slightly later. Therefore, by examining responsiveness in change of the actual air-fuel ratio A/Fr to the change of the calculation air-fuel ratio A/Fk, abnormality of responsiveness of the air-fuel ratio sensor 40 can be detected. Here, in a case where the engine operating condition changes, both a case where the engine accelerates and a case where the engine decelerates are included. The actual air-fuel ratio A/Fr serves as an output air-fuel ratio obtained from the air-fuel ratio sensor 40.

"Engine operating demand" means a demand when an engine operates and is controlled according to the demand of a user (driver in a case of a vehicle) or an operating situation (for example, operation of an air conditioner or the like). That is, an event that an operation condition of the engine 10 changes according to an engine operating demand means an event that the operating condition of the engine 10 changes when the engine is operated and controlled passively, that is, as usual according to the demand of a user or the operating situation. Therefore, a case where the operating condition of the engine 10 is forcibly or actively changed independently from the demand of the user or the operating situation is not included, and a case where an air-fuel ratio is forcibly changed by active air-fuel ratio control typically performed in an air-fuel ratio sensor abnormality diagnosis in a gasoline engine, is not included.

In regard to the engine in the present embodiment, an accelerator member such as an accelerator pedal or an accelerator lever is controlled according to a demand of a user. In addition, an operation quantity of the accelerator member, that is, an accelerator opening is detected by the accelerator opening sensor 27. In consequence, a value of the accelerator opening detected by the accelerator opening sensor 27 becomes a value corresponding to the engine operating demand. Besides, an engine load is changed in response to an operating condition of a peripheral device (air conditioner, A/C generator and the like) (not shown) or in response to a running condition or an environment (down slope or upslope running, highland, cold region and the like) of a vehicle. A signal to be input to ECU 20 for controlling the engine in response to the change of this operating situation corresponds to the engine operating demand.

In this way, in the embodiment of the present invention, not in a case where the engine operating condition or the air-fuel ratio is forcibly or actively changed, but when the engine operating condition happens to relatively rapidly change according to the usual engine operating demand, that is, at the course fluctuation of the engine, abnormality of the air-fuel ratio sensor 40 is diagnosed using changes of the calculation air-fuel ratio A/Fk and the actual air-fuel ratio A/Fr at that time. Therefore, without forcibly transferring the air-fuel ratio to the vicinity of the theoretical air-fuel ratio or fluctuating it, deterioration of the exhaust emission, deterioration of the combustion state, and deterioration of the vibration and the noise at abnormality diagnosing can be certainly prevented. An abnormality diagnosis device suitable for the air-fuel ratio sensor provided in the compression ignition type internal combustion engine can be provided.

Hereinafter, the content of the air-fuel ratio sensor abnormality diagnosis in the present embodiment will be explained with reference to FIG. 2. In the figure, a solid line shows a calculation air-fuel ratio A/Fk and a broken line shows an actual air-fuel ratio A/Fr detected by the air-fuel ratio sensor 40. It should be noted that a flow chart showing the diagnosis procedure in FIG. 3 should be referred to as needed.

The diagnosis process to be explained hereinafter is executed in a digital system by ECU 100.

It is assumed as the precondition that with regard to a change of a calculation air-fuel ratio A/Fk corresponding to a change of an engine operating condition, a time delay, that is, a waste time is small that is ignorable, and both changes occur almost at the same time. Because a fuel injection quantity Q and an intake air quantity Ga can change immediately in response to, for example, a change of an accelerator opening. On the other hand, an actual air-fuel ratio A/Fr changes after elapse of some waste time from the change of each of the engine operating condition and the calculation air-fuel ratio A/Fk. Because the air-fuel ratio sensor 40 is located away at a predetermined distance downstream of the air flowmeter 22 and further, the air-fuel ratio sensor 40 itself has a response delay from a point where an exhaust gas reaches thereto to a point where a signal corresponding to the exhaust gas is outputted.

Figure 2:
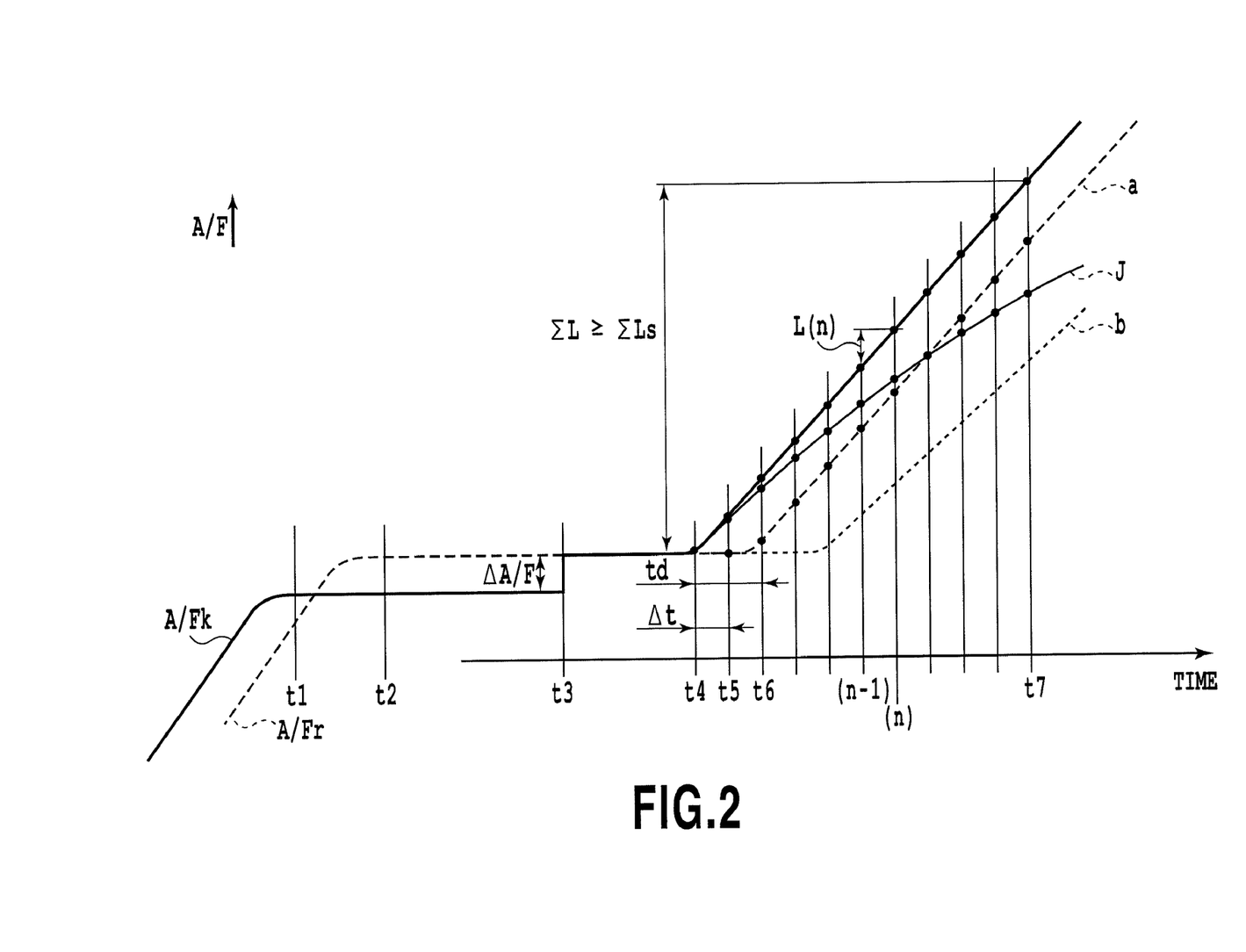
FIG. 2 is a time chart explaining the content of an abnormality diagnosis according to the present embodiment.
Figure 3:
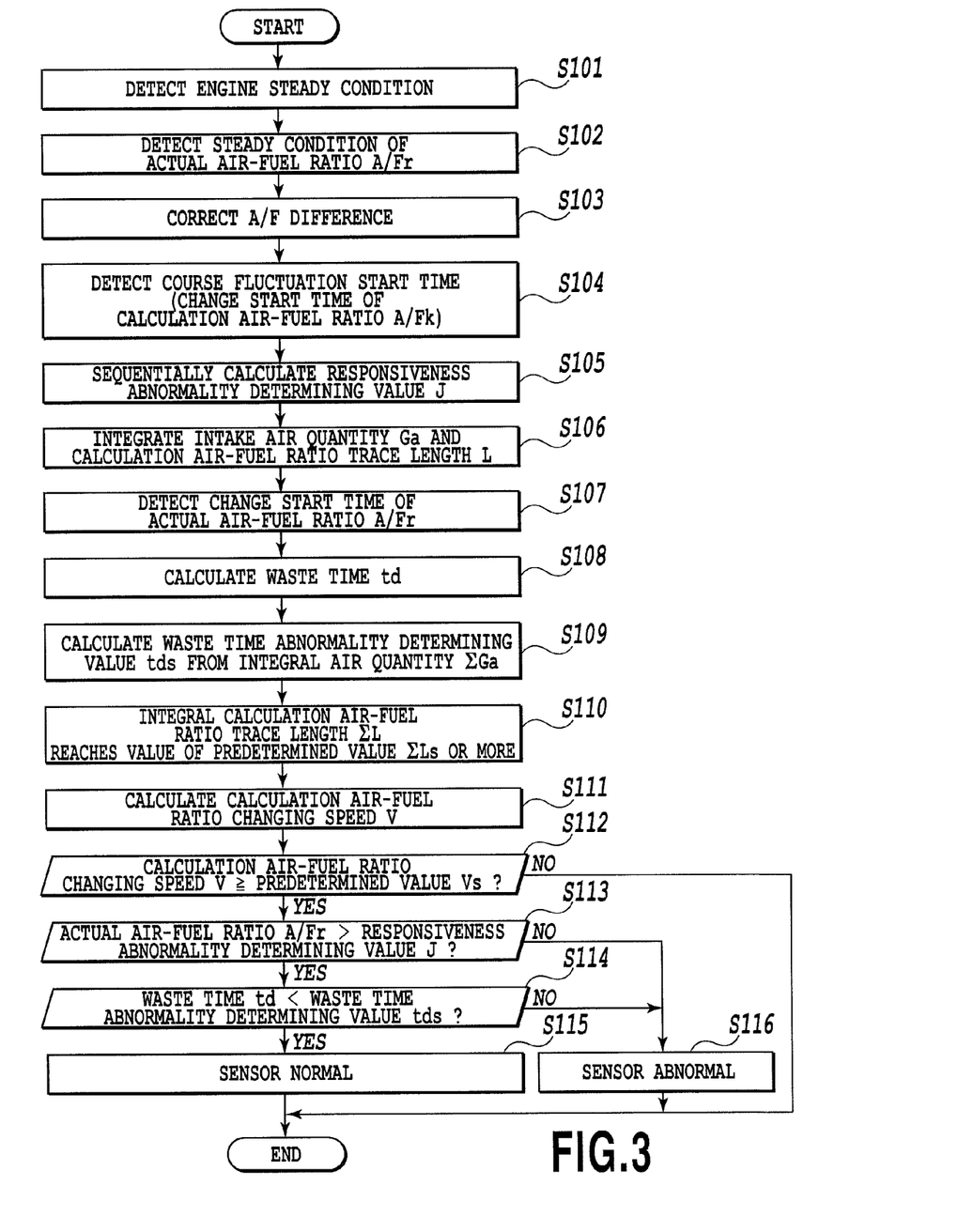
FIG. 3 is a flow chart explaining the content of the abnormality diagnosis according to the present embodiment.

First, a steady condition of the engine is detected by ECU 100 (FIG. 3: step S101). That is, when the detected engine rotation speed Ne and accelerator opening Ac are substantially constant, it is detected that an operating condition of the engine is in a steady condition. As a result of this engine steady condition, a calculation air-fuel ratio A/Fk is also in a substantially constant steady condition (time t1).

Next, a steady condition of an actual air-fuel ratio A/Fr is detected by ECU 100 (FIG. 3: step S102). That is, when the actual air-fuel ratio detected by the air-fuel ratio sensor 40 is substantially constant, it is detected that the actual air-fuel ratio A/Fr is in a steady condition (time t2). Occurrence of the steady condition of the actual air-fuel ratio A/Fr delays from the occurrence of the steady condition of the engine.

When each of the calculation air-fuel ratio A/Fk and the actual air-fuel ratio A/Fr becomes in a steady condition, both the values are not necessarily equal. Because an influence of EGR is not considered in the calculation air-fuel ratio A/Fk, an error exists also in the detection value of the air-fuel ratio sensor 40, and how the exhaust gas runs against the air-fuel ratio sensor 40 differs at each time. Therefore, a magnitude relation between the calculation air-fuel ratio A/Fk and the actual air-fuel ratio A/Fr differs at each time.

Therefore, next, the correction is made by ECU 100 for eliminating a difference in value between the calculation air-fuel ratio A/Fk and the actual air-fuel ratio A/Fr, by making both the values equal (time t3) (FIG. 3: step S103). First, a difference quantity $\Delta A/F$ between both the air-fuel ratios is calculated from Expression: $\Delta A/F=|A/Fk-A/Fr|$, and each value of both the air-fuel ratios is made equal by adding the difference quantity $\Delta A/F$ to a smaller value of both the ratios or by subtracting the $\Delta A/F$ from a larger value of both the ratios. In the shown example, the calculation air-fuel ratio A/Fk is smaller than the actual air-fuel ratio A/Fr. The difference quantity $\Delta A/F$ is added to the calculation air-fuel ratio A/Fk to make the calculation air-fuel ratio equal to the actual air-fuel ratio A/Fr.

Figure 4:
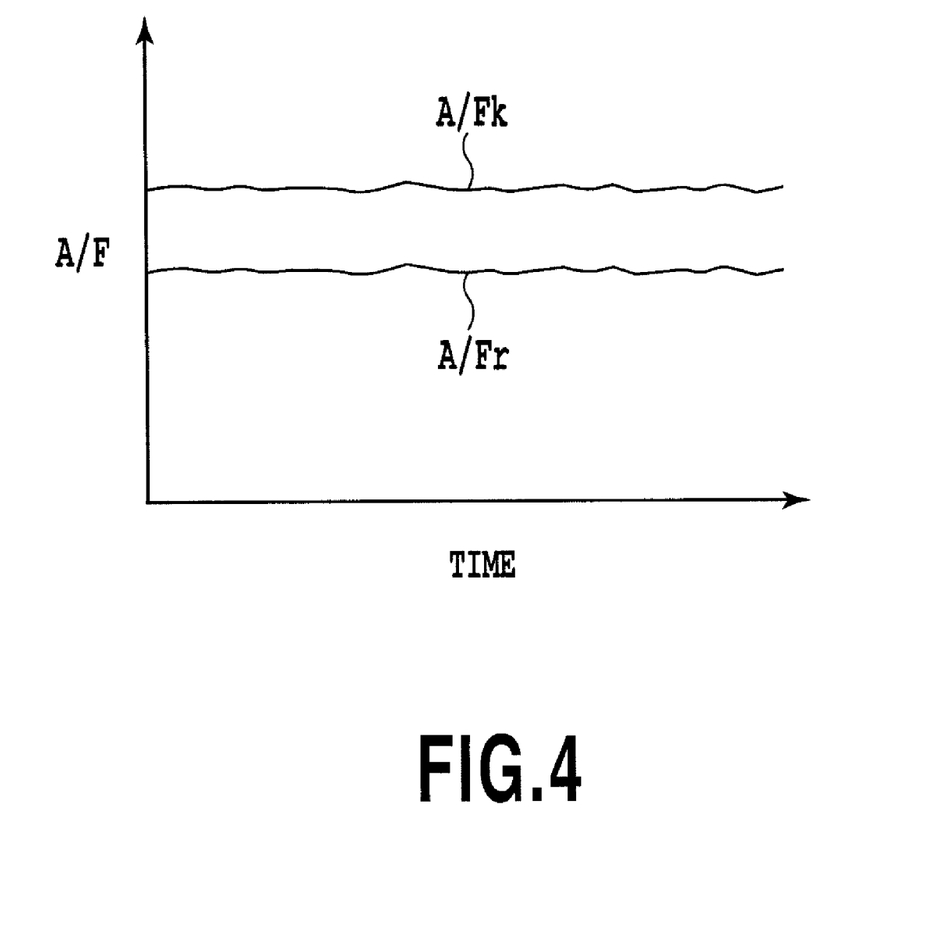
FIG. 4 is a graph showing a calculation air-fuel ratio and an actual air-fuel ratio in a steady condition.
Figure 5:
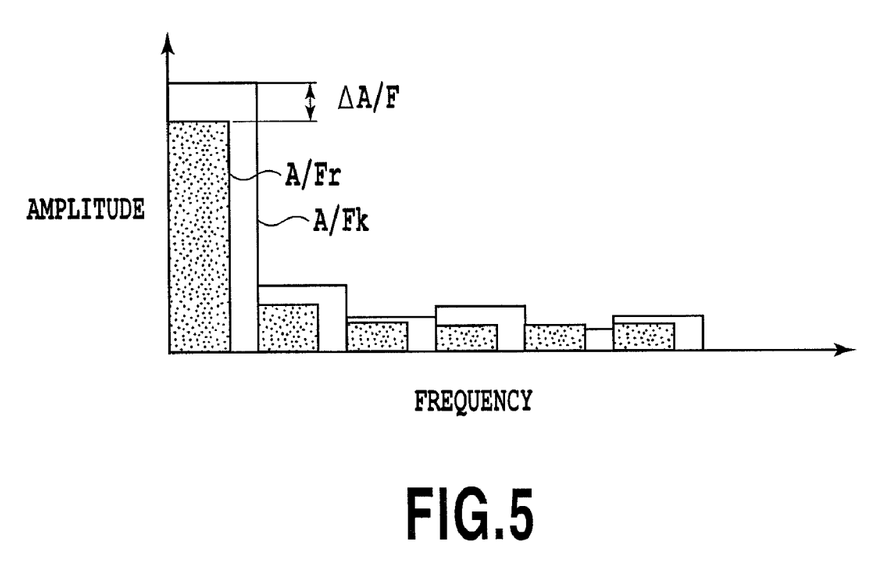
FIG. 5 is a result of carrying out Fourier analysis to an actual measurement value in FIG. 4.

On this occasion, in regard to each value of the calculation air-fuel ratio A/Fk and the actual air-fuel ratio A/Fr to be used for difference quantity calculation, it is preferable to use a value found by executing a predetermined calculation process to each actual measurement value of both the ratios. For example, an average value found by simply averaging a plurality of actual measurement values measured during a predetermined period can be used. Or a Fourier analysis may be carried out to the plurality of the actual measurement values to use only direct current components at the low level. That is, when a plurality of actual measurement values are obtained for each predetermined calculation period in regard to the calculation air-fuel ratio A/Fk and the actual air-fuel ratio A/Fr in a steady condition as shown in FIG. 4, for example and the Fourier analysis is carried out to the actual measurement values, an amplitude value is found for each of the plural frequency bands as shown in FIG. 5. Since this value is a value in a steady condition of the air-fuel ratio, some low frequency component only is dominant and the frequency component other than that is very small. Therefore, amplitudes in the frequency bands where each amplitude of both the air-fuel ratios is at a maximum are found among the plurality of the frequency band. Then, an absolute value of a difference of the found amplitudes is found which is made to be a difference quantity $\Delta A/F$. Since only the value at the low level is used for the difference quantity calculation, a calculation load is reduced.

When this difference correction is made, the abnormality diagnosis can be performed after the difference between the calculation air-fuel ratio A/Fk and the actual air-fuel ratio A/Fr is eliminated, improving the diagnosis accuracy.

After this difference correction is made, the diagnosis process is in a standby state until the engine operating condition relatively rapidly changes according to the engine operating demand, that is, until the course fluctuation starts. When the course fluctuation starts, the fluctuation start time t4 is detected and stored by ECU 100 (FIG. 3: step S104). The calculation air-fuel ratio A/Fk also starts to change at the same time as the course fluctuation start, and the course fluctuation start time t4 is regarded as a change start time of the calculation air-fuel ratio A/Fk. It should be noted that in a case where the difference correction is not completed before the course fluctuation starts, the diagnosis is stopped.

In FIG. 2, each calculation timing is shown in a vertical line at every predetermined calculation period Δt after the fluctuation start time t4. It should be noted that the calculation at every predetermined calculation period Δt is done also prior to the fluctuation start time t4. In regard to determination of the course fluctuation start, when at least one of the detected accelerator opening Ac and the detected rotation speed Ne changes by more than a predetermined value during one or a plurality of calculation periods, ECU 100 determines that the course fluctuation has started. The figure shows a case where the calculation air-fuel ratio A/Fk changes to a higher value or a lean side due to the start of the course fluctuation.

When the course fluctuation starts, ECU 100 sequentially calculates at every calculation timing a reference value for responsiveness abnormality determination of the air-fuel ratio sensor 40, that is, a responsiveness abnormality determining value J based upon the calculation air-fuel ratio A/Fk (FIG. 3: step S105). The responsiveness abnormality determining value J is compared with an actual air-fuel ratio A/Fr later and is used at the time of determining abnormality of the air-fuel ratio sensor 40. The responsiveness abnormality determining value J is obtained by executing a predetermined calculation process in consideration of a physical model or the like to the calculation air-fuel ratio A/Fk. For example, the responsiveness abnormality determining value J is calculated by multiplying the calculation air-fuel ratio by a transfer function of first or higher degree lag. The shown example is an example of using a transfer function of first degree lag. Otherwise the responsiveness abnormality determining value J may be calculated by executing moving average process to the calculation air-fuel ratio A/Fk. Further, more simply the responsiveness abnormality determining value J may be calculated by dividing the calculation air-fuel ratio A/Fk by a value larger than 1. In other words, any calculation process may be adopted as long as the responsiveness abnormality determining value J which follows the calculation air-fuel ratio A/Fk and which changes in value slightly later than it can be calculated. It should be noted that a parameter in the calculation process may be changed based upon an engine operating condition (for example, rotation speed Ne and accelerator opening Ac).

In addition, after the course fluctuation has started, ECU 100 integrates values of an intake air quantity Ga and a calculation air-fuel ratio trace length L at every calculation timing (FIG. 3: step S106). The integration of the intake air quantity Ga is conducted from the calculation timing t5 next to the fluctuation start time t4. On the other hand, "calculation air-fuel ratio trace length L" means a difference in calculation air-fuel ratio between the calculation timings of this time (n) and the previous time (n−1), and the calculation air-fuel ratio trace length L (n) at the calculation timing of this time is expressed by Expression: L (n)=A/Fk (n)−A/Fk (n−1). This calculation air-fuel ratio trace length L is integrated at every calculation timing from the calculation timing t5 next to the fluctuation start time t4.

Further, when the actual air-fuel ratio A/Fr starts to change after the course fluctuation has started, the change start time t6 is detected and stored by ECU 100 (FIG. 3: step S107). In regard to determination of the change start, when an actual air-fuel ratio A/Fr (n) at the calculation timing of this time is larger by a predetermined value than the actual air-fuel ratio A/Fr (n−1) at the calculation timing of the previous time, ECU 100 determines that the actual air-fuel ratio A/Fr has started. The figure shows a case where the actual air-fuel ratio A/Fr changes to a higher value or a leaner side by following a change of the calculation air-fuel ratio A/Fk. It should be noted that a broken line "a" shows a case where the air-fuel ratio sensor is normal, and a broken line "b" shows a case where the air-fuel ratio sensor is abnormal.

Next, ECU 100 calculates a difference between the course fluctuation start time (calculation air-fuel ratio change start time) t4 and the actual air-fuel ratio change start time t6 (t6−t4) as a waste time td (FIG. 3: step S108). This waste time td corresponds to a delay time from a point where the calculation air-fuel ratio changes to a point where the actual air-fuel ratio changes.

Figure 6:
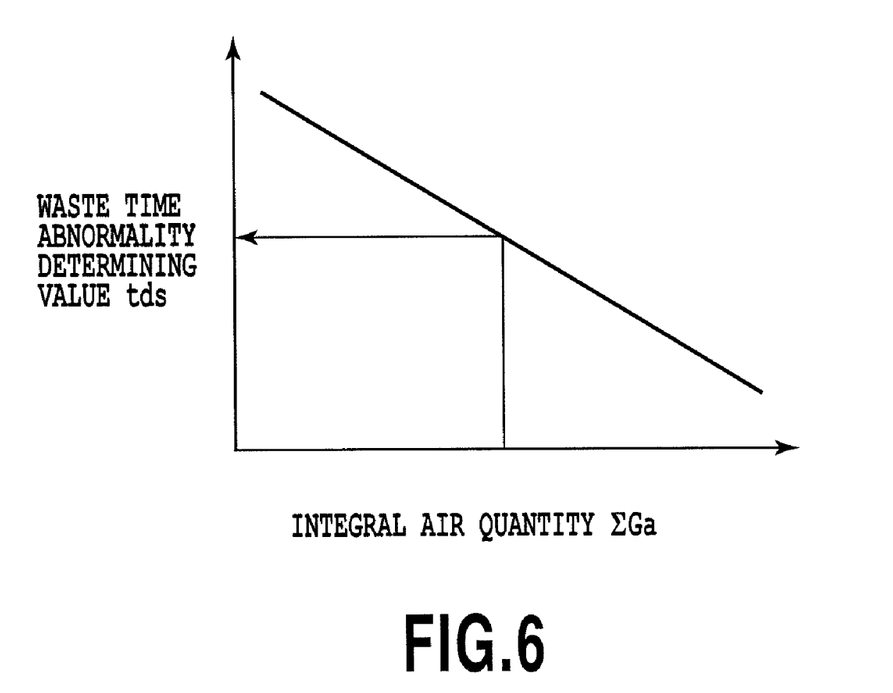
FIG. 6 is a map for calculating a waste time abnormality determining value.

Thereafter, ECU 100 calculates a value as a waste time abnormality determining value tds using a given map (function may be used) as shown in FIG. 6 based upon an integral value of the intake air quantity Ga integrated until the change start time t6 of the actual air-fuel ratio, that is, an integral air quantity ΣGa (FIG. 3: step S109). The waste time abnormality determining value tds is a reference value for determining whether or not the actually detected waste time td is normal. As the intake air quantity is the larger, the flow rate of the exhaust gas is the larger, thereby shortening the waste time. Therefore, in a map, both the integral air quantity ΣGa and the waste time abnormality determining value tds are associated with each other so that as the integral air quantity ΣGa increases, the waste time abnormality determining value tds reduces. By setting the waste time abnormality determining value tds using this map, it is possible to set an appropriate waste time abnormality determining value tds in consideration of the exhaust gas flow rate during this waste time, making it possible to accurately detect abnormality of the waste time.

Next, ECU 100 detects that an integral value of the calculation air-fuel ratio trace length L, that is, an integral calculation air-fuel ratio trace length ΣL has reached a value equal to or more than a predetermined value ΣLs (time t7) (FIG. 3: step S110).

Then, ECU 100 calculates a calculation air-fuel ratio changing speed V based upon the integral calculation air-fuel ratio trace length ΣL at the reach time t7 and time (t7−t4) from the course fluctuation start time t4 to the reach time t7 (FIG. 3: step S111). The calculation air-fuel ratio changing speed V is expressed by Expression: $V=\Sigma L/(t7-t4)$.

Next, ECU 100 compares the calculation air-fuel ratio changing speed V with a predetermined value Vs (FIG. 3: step S112). When the calculation air-fuel ratio changing speed V is less than the predetermined value Vs, the diagnosis is stopped and thereafter, the abnormality determination is not made. On the other hand, when the calculation air-fuel ratio changing speed V is equal to or more than the predetermined value Vs, the diagnosis is continued.

The present diagnosis, when a calculation air-fuel ratio relatively rapidly changes, detects a change of an actual air-fuel ratio at this time to evaluate responsiveness of the air-fuel ratio sensor 40. Accordingly, when the calculation air-fuel ratio relatively slowly changes, the change of the actual air-fuel ratio also becomes slow, creating a possibility that the responsiveness of the air-fuel ratio sensor 40 can not be accurately evaluated. From this point of view, the diagnosis is designed to be stopped when the calculation air-fuel ratio changing speed V is less than the predetermined value Vs. When the calculation air-fuel ratio changing speed V is equal to or more than the predetermined value Vs, that is, only in a case where the calculation air-fuel ratio sufficiently fast changes, the diagnosis is made. Therefore, the responsiveness abnormality of the air-fuel ratio sensor 40 can be accurately detected.

When the calculation air-fuel ratio changing speed V is equal to or more than the predetermined value Vs, comparison between the actual air-fuel ratio A/Fr at the reach time t7 and the responsiveness abnormality determining value J at the reach time t7 is made by ECU 100 (FIG. 3: step S113). When the actual air-fuel ratio A/Fr is larger than the responsiveness abnormality determining value J (case of a broken line "a" in FIG. 2), the actual air-fuel ratio A/Fr follows and changes sufficiently fast, and the responsiveness of the air-fuel ratio sensor 40 can be assumed as normal.

On the other hand, when the actual air-fuel ratio A/Fr is equal to or less than the responsiveness abnormality determining value J (case of a broken line "b" in FIG. 2), the actual air-fuel ratio A/Fr follows and changes slowly, and the responsiveness of the air-fuel ratio sensor 40 can be assumed as abnormal. Therefore, in this case, it is immediately and finally determined by ECU 100 that the air-fuel ratio sensor 40 is abnormal (FIG. 3: step S116).

When the actual air-fuel ratio A/Fr is larger than the responsiveness abnormality determining value J, next, comparison between the waste time td (=t6−t4) and the waste time abnormality determining value tds is made by ECU 100 (FIG. 3: step S114). That is, even if the responsiveness of the air-fuel ratio sensor 40 is normal, when the detected waste time td is very long, the initial responsiveness of the air-fuel ratio sensor 40 is possibly deteriorated or some abnormality possibly occurs at a portion upstream of the air-fuel ratio sensor 40. Therefore, when the waste time td is a value equal to or more than the waste time abnormality determining value tds, the waste time td of the air-fuel ratio sensor 40 is assumed as abnormal and the air-fuel ratio sensor 40 is finally determined to be abnormal by ECU 100 (FIG. 3: step S116). It should be noted that for informing a user of this final abnormality determination in response thereto, it is preferable to operate a warning device (warning lamp, buzzer or the like).

On the other hand, when the waste time td is a value less than the waste time abnormality determining value tds, the air-fuel ratio sensor 40 is finally determined to be normal by ECU 100 (FIG. 3: step S115). Thus, according to the present embodiment, for accurate determination, only when two conditions (1): condition that the actual air-fuel ratio A/Fr is larger than the responsiveness abnormality determining value J at the reach time t7 (that is, responsiveness is normal) and (2): condition that the waste time td is less than the waste time abnormality determining value tds (that is, waste time is normal) are established, it is finally determined that the air-fuel ratio sensor 40 is normal, and when any of both the conditions is not established, it is finally determined that the air-fuel ratio sensor 40 is abnormal. However, other determination method may be adopted. For example, when any of the two conditions is established, it may be determined that the air-fuel ratio sensor 40 is normal and when both the two conditions are not established, it may be determined that the air-fuel ratio sensor 40 is abnormal. The determination may be made only by any of the two conditions, and in this case, only any of the responsiveness abnormality and the waste time abnormality is determined.

Thus, according to the abnormality diagnosis of the present embodiment, since the diagnosis of the air-fuel ratio sensor 40 can be performed at a usual operating time of the engine without forcibly changing the engine operating condition or the air-fuel ratio, deterioration of the exhaust emission and the engine combustion state, and deterioration of the vibrations, noises and the like can be certainly prevented. Therefore, the abnormality diagnosis of the present embodiment is very suitable for the air-fuel ratio sensor in the diesel engine. In addition, since the responsiveness abnormality determining value to be compared with the actual air-fuel ratio is calculated based upon the calculation air-fuel ratio, the appropriate responsiveness abnormality determining value according to the actual changing state of the calculation air-fuel ratio can be obtained. That is, when the changing speed of the calculation air-fuel ratio is large, the responsiveness air-fuel ratio determining value having a large changing speed can be obtained, and in reverse, when the changing speed of the calculation air-fuel ratio is small, the responsiveness air-fuel ratio determining value having a small changing speed can be obtained. Here, the abnormality determination is made after a predetermined elapse time from the change start of the calculation air-fuel ratio. It is preferable to determine a parameter in the calculation process at the time of finding the responsiveness abnormality determining value so that the appropriate responsiveness abnormality determining value can be obtained at this abnormality determining time. Further, since the abnormality of the air-fuel ratio sensor 40 is diagnosed when the operating condition of the engine relatively rapidly changes from a steady condition, the abnormality diagnosis can be performed, for example, at vehicle starting from an idling condition or at accelerating or decelerating from a constant speed running, thus securing many diagnosis opportunities. In addition, after the values of both the air-fuel ratios become stable, the diagnosis starts substantially. Therefore, it is possible to improve the diagnosis accuracy.

As described above, the embodiment of the present embodiment is explained, but the present invention can adopt the other embodiment. For example, in the above embodiment, the responsiveness abnormality determining value is calculated from the calculation air-fuel ratio to compare the responsiveness abnormality determining value with the actual air-fuel ratio, but the present invention is not limited thereto. For example, the calculation air-fuel ratio may be directly compared with the actual air-fuel ratio. For example, when the difference between the calculation air-fuel ratio and the actual air-fuel ratio is larger than a predetermined value, the air-fuel ratio sensor can be determined to be abnormal. Upon calculating the calculation air-fuel ratio, the other values (for example, intake temperature, intake pressure, atmospheric pressure, and the like) may be used in addition to the fuel injection quantity and the intake air quantity.

The embodiment of the present invention is not limited to the aforementioned embodiment only, but all modifications, application examples, and its equivalents contained in the spirit of the present invention defined by the scope of the claims can be included in the present invention. Accordingly the present invention should not be interpreted in a limited way, and can be applied to any other technology falling within the spirit of the present invention.

Industrial Applicability

The present invention can be applied to an air-fuel ratio sensor detecting an air-fuel ratio of exhaust gas in a compression ignition type internal combustion engine.

The invention claimed is:

1. An abnormality diagnosis device for an air-fuel ratio sensor detecting an air-fuel ratio in exhaust gas in a compression ignition type internal combustion engine comprising:
    calculation air-fuel ratio calculating means for calculating a calculation air-fuel ratio based upon at least a fuel injection quantity and an intake air quantity in the internal combustion engine; and
    abnormality determining means for determining abnormality of the air-fuel ratio sensor based upon the calculation air-fuel ratio and an actual air-fuel ratio detected by the air-fuel ratio sensor, when an operating condition in the internal combustion engine relatively rapidly changes according to an engine operating demand and thereby the calculation air-fuel ratio relatively rapidly changes, wherein the abnormality determining means determines the abnormality of the air-fuel ratio sensor when the operating condition in the internal combustion engine relatively rapidly changes from a steady condition, and makes correction for making the calculation air-fuel ratio equal to the actual air-fuel ratio when the calculation air-fuel ratio and the actual air-fuel ratio become in a steady condition during the steady condition of the internal combustion engine.

2. The abnormality diagnosis device for an air-fuel ratio sensor according to claim 1, wherein the abnormality determining means calculates a responsive abnormality determining value based upon the calculation air-fuel ratio and compares the actual air-fuel ratio after a predetermined elapse time from a change start of the calculation air-fuel ratio with the responsive abnormality determining value to determine the abnormality of the air-fuel ratio sensor.

3. The abnormality diagnosis device for an air-fuel ratio sensor according to claim 1, wherein the abnormality determining means calculates a waste time from a difference between a change start time of the calculation air-fuel ratio and a change start time of the actual air-fuel ratio and compares the waste time with a predetermined waste time abnormality determining value to determine the abnormality of the air-fuel ratio sensor, and the abnormality determining means calculates an integral value of intake air quantity during the waste time and calculates the waste time abnormality determining value based upon the integral value of the intake air quantity.

4. The abnormality diagnosis device for an air-fuel ratio sensor according to claim 1, wherein the abnormality determining means calculates a changing speed when the calculation air-fuel ratio changes by a predetermined value or more, and determines the abnormality of the air-fuel ratio sensor when the changing speed is a predetermined value or more.

5. An abnormality diagnosis device for an air-fuel ratio sensor detecting an air-fuel ratio in exhaust gas in a compression ignition type internal combustion engine comprising:

calculation air-fuel ratio calculating means for calculating a calculation air-fuel ratio based upon at least a fuel injection quantity and an intake air quantity in the internal combustion engine; and abnormality determining means for determining abnormality of the air-fuel ratio sensor based upon the calculation air-fuel ratio and an actual air-fuel ratio detected by the air-fuel ratio sensor, when an operating condition in the internal combustion engine relatively rapidly changes according to an engine operating demand and thereby the calculation air-fuel ratio relatively rapidly changes, wherein the abnormality determining means calculates a waste time from a difference between a change start time of the calculation air-fuel ratio and a change start time of the actual air-fuel ratio and compares the waste time with a predetermined waste time abnormality determining value to determine the abnormality of the air-fuel ratio sensor, wherein the abnormality determining means calculates an integral value of an intake air quantity during the waste time and calculates the waste time abnormality determining value based upon the integral value of the intake air quantity.

* * * * *